United States Patent Office 3,440,026
Patented Apr. 22, 1969

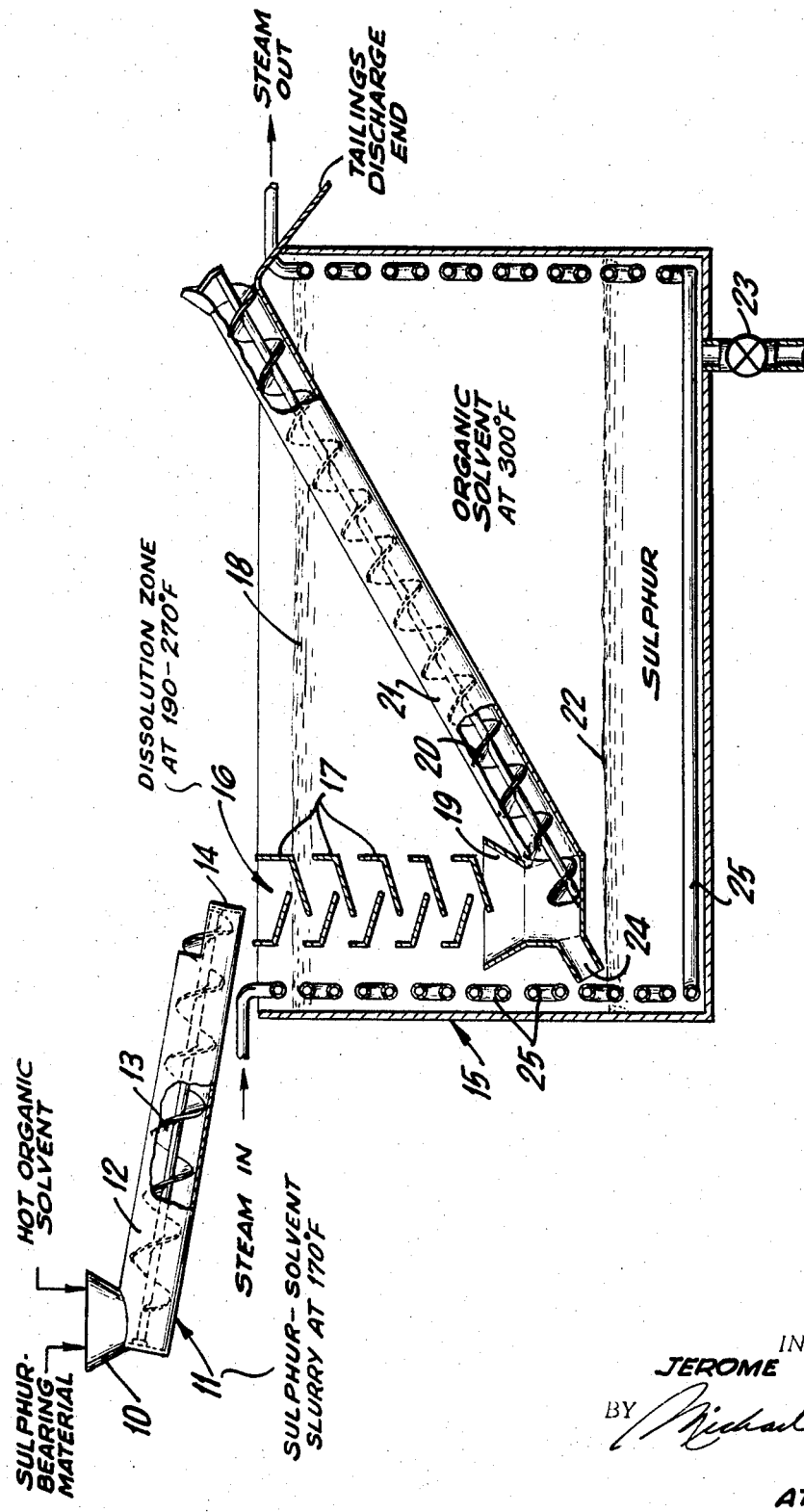

3,440,026
SOLVENT EXTRACTION OF ELEMENTAL SULPHUR FROM SULPHUR-BEARING MATERIALS
Jerome Dubow, Port Washington, N.Y., assignor to Dubow Chemical Corporation, Valley Stream, N.Y., a corporation of New York
Filed Oct. 6, 1966, Ser. No. 584,743
Int. Cl. C01b 17/08
U.S. Cl. 23—308          11 Claims This invention relates to a process and apparatus for the solvent extraction of sulphur from sulphur-bearing ores, flue dust, smelter by-products, such as smelter tailings, and from other materials containing sulphur in the elemental form.

It is known to recover elemental sulphur from sulphur-bearing ores and the like materials by selectively leaching the sulphur-bearing material with a hot organic liquid solvent, such as kerosene and similar hydrocarbon solvents. The sulphur dissolved by the hot liquid is recovered by cooling the liquid to a temperature at which sulphur crystallizes out, the sulphur being thereafter separated from the cooled liquid.

A method utilizing the crystallization technique is described in U.S. Patent No. 3,063,817. In the preferred method disclosed, sulphur-containing ore in the comminuted condition is preheated to a temperature below the melting point of sulphur and then mixed with an aliphatic hydrocarbon, the sulphur being extracted from the ore at a temperature range between 85° C. to 132° C. preferably between 120° C. and 130° C. According to the patent, the upper temperature limit of 132° C. is extremely important in that, when this temperature is exceeded, liquid sulphur is produced which is not absorbed by the solvent and which interferes with the efficiency of the reaction. It tends to collect at the bottom parts of the apparatus, solidifies, becomes hard and adheres tenaciously to the surface on which it solidifies. In addition, care must be taken in the preliminary heating of the material that the temperature does not substantially exceed the melting point of the sulphur, otherwise the sulphur melts and flows therefrom and solidifies, thereby causing handling difficulties.

Thus, the method described by the patent is limited to the production of crystallized sulphur, which method requires a plurality of operational steps in which a great deal of care has to be taken to insure the recovery of crystallized sulphur.

It is the object of the invention to provide a method and apparatus for the solvent extraction of elemental sulphur from sulphur-bearing materials, wherein substantially all of the sulphur is extracted and collected in the liquid state at optimum efficiency.

Another object is to provide a continuous method for extracting sulphur from sulphur-bearing materials in which the sulphur is extracted from the material by utilizing a dissolution leaching treatment, but which in the same process the sulphur is thereafter recovered and collected in the liquid state, while avoiding the disadvantages mentioned hereinbefore.

As a further object the invention also provides a three-step solvent extraction method for recovering sulphur comprising a preheat and mixing step, a dissolution step and a precipitation step in which liquid sulphur is collected in a flowable condition.

These and other objects will more clearly appear when taken in conjunction with the following description taken together with the accompanying drawing which is illustrative of one embodiment for carrying out the invention, it being understood that various apparatus embodiments may be employed for carrying out the novel method provided by the invention.

Stating it broadly, the method aspects of the invention comprises providing a zone of a hot mixture of a sulphur-bearing material and an organic solvent maintained at a dissolution temperature sufficient to dissolve selectively the free sulphur in the ore, the organic solvent being one having a boiling point above 300° F. The dissolution temperature particularly advantageous for carrying out the invention may fall within the range of about 190° F. to below about 270° F. The solvent with the dissolved sulphur is then caused to move into another zone of solvent maintained at a higher temperature at which sulphur is insoluble whereby to precipitate it as a flowable liquid. The temperature in this zone may range from about 290° F. to below 400° F. However, I have found the range of about 290° F. to about 300° F. to be particularly advantageous because as the temperature approaches 400° F. and above, the precipitated sulphur becomes very viscous and is difficult to remove from the treating vessel. Thus, by maintaining the precipitation temperature over the preferred range stated hereinabove, sulphur in a flowable liquid condition is obtained which can be easily removed from the precipitation zone, while the leached residue is being removed from the dissolution zone.

In employing the method in commercial practice, I prefer to use a three-step approach. In this embodiment, a first preheat zone is formed comprising a hot mixture of the sulphur-bearing material and the organic solvent maintained at a low temperature range just below the melting point of sulphur at which the sulphur is insoluble, for example at about 160° F. to about 185° F., a temperature of about 170° F. being preferred. The foregoing preheated mixture is then fed into a second zone of the solvent to provide an intermediate temperature range at which sulphur is substantially soluble in the solvent. The temperature in the second zone may range from about 190° F. to below 270° F. The mother liquor in this zone with the dissolved sulphur is then caused to move into a third zone of solvent maintained at a still higher temperature substantially above the melting point of sulphur, at which temperature the sulphur is insoluble and precipitates as a liquid. However, the temperature must be controlled so that the sulphur precipitates as a flowable liquid. As stated above, while the precipitated temperature may range from about 290° F. to below 400° F., it is preferred that it be controlled over the temperature range of about 290° F. to about 300° F.

The organic solvent employed should have the following temperature and chemical characteristics: it should, when heated, provide a low temperature range, e.g. about 160° F. to about 185° F., just below the melting point of sulphur at which sulphur is insoluble, an intermediate temperature range at which the sulphur is soluble in the solvent, e.g. about 190° F. to below 270° F.; and a higher temperature range substantially above the melting point of sulphur, at which the sulphur is insoluble, e.g. about 290° F. to below 400° F., and from which solvent the sulphur precipitates as a flowable liquid.

An example of an organic solvent having the foregoing characteristics is a kerosene fraction having a boiling point above about 300° F. Broadly speaking, the organic solvent may be an open chain hydrocarbon selected from aliphatic hydrocarbons of boiling points above 300° F. which include olefinic and paraffinic solvents and chlorinated derivatives thereof having up to 18 carbon atoms. Examples of paraffinic hydrocarbons are nonanes, decanes, undecanes, etc., while olefinic solvents include nonenes, decenes, undecenes and so on up to 18 carbon atoms. Examples of specific solvents besides kerosene are diesel oil and stove oil. Chlorinated hydrocarbons of boiling point above 300° F. include 2-ethylhexyl chloride and 1,2,3-trichlorpropane.

As stated herein, the process may be employed in recovering elemental sulphur from sulphur-bearing ores, flue dust, smelter by-products and the like. For economical reasons, I prefer treating sulphur-bearing ores containing at least 15% sulphur. Such ores may range in sulphur content from about 15% to about 35% by weight and higher. An ore I have found particularly adapted to my process is one mined in Lost Hills, Calif., containing about 25% sulphur, with substantially the balance carbonaceous ash and granite. To render the ore amenable to sulphur extraction, the ore is comminuted, to yield a product which will pass through a ⅛″ to ¼″ screen. I have found that in treating this product in accordance with my invention, I can obtain sulphur recoveries as high as about 98% and higher based on the original assay of the material.

In carrying out the invention in accordance with the apparatus embodiment shown in the accompanying drawing, the following method is employed:

The comminuted ore in substantially the dry state containing about 25% elemental sulphur is fed at ambient temperature to hopper 10 of preheat and mixing zone 11 comprising an elongated shell 12 of suitable metal, e.g. steel, having disposed axially within it a screw conveyor 13 which extends to outlet 14 of the preheat zone. Coincident with the feeding of the ore is fed hot organic solvent at about 300° F., for example a kerosene fraction having a boiling point above 300° F., the amount of solvent being sufficient to form a hot flowable mixture, the ratio of the solvent to the ore being such that the mixture has an average temperature below the melting point of sulphur of about 170° F. Depending upon the incoming temperature of the ore, the temperature of the solvent, and the preheat temperature desired, the ratio of the sulphur-bearing material to the solvent by weight may range from about 1 to 1 to about 1 to 5.

Associated with the preheat zone is a sulphur extraction and collecting tank 15 in which is provided a main body of organic solvent 18 having defined in it two zones; a dissolution zone 16 formed of a series of vertically disposed baffles 17 as shown, which may also take the form of a series of vertically spaced funnels coaxially supported one above the other, the dissolution zone being located at one end of the tank and directly below outlet 14 of preheat and mixing zone 11. The main body 18 of the solvent, which is referred to as the third zone, is maintained at an elevated temperature, e.g. about 300° F., at which dissolved sulphur precipitates as a liquid. The dissolution or second zone 16 communicates with the third zone at various levels via spaces between the baffles.

During continuous operation, the temperature along at least a portion of the dissolution zone is maintained at a dissolution temperature by virtue of heat exchange between the entering lower temperature mix and the main body of the solvent. The dissolution temperature within the range of 190° F. to 270° F. is determined by controlling the rate of feed of the hot mix from preheat zone 11 until a steady state is achieved in the dissolution zone corresponding to the desired temperature. I have found it desirable for my purposes for the temperature of the hot mix discharged from the preheat zone into the dissolution zone to be about 170° F., the rate of discharge being such as to provide a dissolution temperature in at least a portion of the second zone of about 225° F. by virtue of the heat exchange of the hot mix with the body of solvent 18.

Because of the relatively high density of the material discharged into the dissolution zone, the hot mix falls gravimetrically from one baffle surface to another towards the bottom of the tank, during which elemental sulphur is selectively dissolved by the organic solvent. Because of the downward flow of the material through the dissolution zone, circulation develops in the region about the zone, whereby the mother liquor containing the dissolved sulphur is caused to mix with the higher temperature solvent adjacent the zone, during which precipitation of liquid sulphur occurs. The leached tailings drop into a hopper 19 near the bottom of the tank where it is collected and continuously withdrawn by an inclined screw conveyor 20 confined in a trough 21 which delivers the tailings to the top of the tank and discharged as shown.

The sulphur 22 as it precipitates collects at the bottom of the tank from which it is removed via valve 23 and suitable pump means (not shown). The hopper 19 communicates at 24 with the solvent in the tank so that any liquid sulphur formed will flow to the bottom of the tank. The liquid sulphur may be tapped into a holding tank maintained at a temperature above the melting point of sulphur, the tank being provided with one or more bleed-off valves for removing desired amounts of sulphur. The sulphur removed may be cast into blocks for shipment.

As will be appreciated, the tailings also contain solvent which may be subjected to recovery treatment. One method is to feed the tailings in a tank of water where the solvent gravimetrically separates from the water, the solvent rising to the surface from which it is removed and recycled into the system and the tailings washed and dried and sold as a by-product of the process, for example, as fertilizer after further treatment.

It is important that the temperature of the main body of the solvent in the tank be maintained at the proper precipitation temperature. This is achieved by employing a heat exchanger, such as steam heated coils or other heating means. To insure a relatively constant temperature outside the dissolution zone, it is preferred that the heating coils line the bottom and the sides of the tank. Steam at a temperature of about 600° F. may be employed to heat the solvent, it being understood that temperature control means well known in the art may be provided for automatically controlling the temperature in the tank via a thermostatically operable valve means coupled to the incoming steam line.

In carrying out the process on a continuous basis, a proper balance of solvent is maintained by continuously pumping hot solvent from the tank to hopper 10 of the pre-heat zone, make-up solvent being added to compensate for the removal of solvent with the tailings and to compensate for any losses due to evaporation.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What I claim is:

1. In a process for the solvent extraction of elemental sulphur from sulphur-bearing materials using a hot organic solvent the improvement comprising, providing a dissolution zone of a hot mixture of a sulphur-bearing material and an organic solvent maintained at a sulphur-dissolving temperature through which the hot mixture passes in a downward direction, said organic solvent having a boiling point above about 300° F., feeding said solvent with dissolved sulphur directly from said dissolution zone into another zone of solvent, said another zone of solvent being in surrounding relationship to the dissolution zone and being maintained at a higher temperature below its boiling point at which said sulphur precipitates as a flowable liquid, and maintaining said other zone at said higher temperature while said liquid sulphur precipitates.

2. The process of claim 1 wherein a residue formed during the extraction is removed and wherein the flowable liquid sulphur is separated from said higher temperature zone.

3. The process of claim 2 wherein the organic solvent is selected from the group consisting of an aliphatic hydrocarbon having up to 18 atoms and chlorinated derivatives thereof.

4. The process of claim 3 wherein the organic solvent is a kerosene fraction of boiling point above 300° F.

5. The process of claim 1 wherein the sulphur-dissolving temperature is maintained in the range of about 190° F. to below about 270° F. and wherein the precipitation temperature in the higher temperature zone is maintained from about 290° F. to below about 400° F.

6. The process of claim 5 wherein the sulphur-dissolving temperature is maintained at approximately 225° F. and wherein the precipitation temperature is maintained at approximately 300° F.

7. In a process for the solvent extraction of elemental sulphur from sulphur-bearing materials using a hot organic solvent the improvement comprising; providing a sulphur-dissolving organic liquid of boiling point above about 300° F. characterized by a series of sulphur-treating temperature ranges comprising a low temperature range just below the melting point of said sulphur at which temperature sulphur is insoluble, an intermediate temperature range at which sulphur is substantially soluble and an upper temperature range substantially above the melting point of sulphur at which temperature sulphur is insoluble and precipitates as flowable liquid; forming a first pre-heat and mixing zone of a hot mixture of said sulphur-bearing material and said organic solvent at said low temperature range; feeding said hot mixture downwardly into a second zone whereby to heat said mixture to an intermediate temperature at which sulphur dissolves in said solvent; feeding said solvent with said dissolved sulphur directly from the second zone to said third zone of solvent, said third zone of solvent being in surrounding relationship to the second zone and being maintained at a higher temperature to cause said sulphur to precipitate as a flowable liquid; separating said flowable sulphur from said zone of higher temperature, and removing the residue remaining from the treated material.

8. The process of claim 7 wherein the organic solvent is selected from the group consisting of an aliphatic hydrocarbon having up to 18 carbon atoms and chlorinated derivatives thereof.

9. The process of claim 8 wherein the organic solvent is a kerosene fraction of boiling point above 300° F.

10. The process of claim 7 wherein the temperature in the pre-heat and mixing zone ranges from about 160° F. to 185° F., wherein the temperature in the second zone ranges from about 190° F. to below 270° F., and wherein the temperature in the third zone ranges from about 290° F. to below 400° F.

11. The process of claim 10 wherein the temperature in the pre-heating and mixing zone is approximately 170° F., wherein the temperature in the second zone is approximately 225° F. and wherein the temperature in the third zone is approximately 300° F.

References Cited

UNITED STATES PATENTS

| | | |
|---|---|---|
| 2,088,190 | 7/1937 | Du Pont. |
| 2,409,408 | 10/1946 | Tweeddale _____ 23—312 |
| 2,890,941 | 6/1959 | Bartlett et al. |
| 3,063,817 | 11/1962 | Simpson _____ 23—312 |
| 3,226,202 | 12/1965 | Nagelvoort. |

NORMAN YUDKOFF, *Primary Examiner.*

V. W. PRETKA, *Assistant Examiner.*

U.S. Cl. X.R.

23—224, 312